United States Patent [19]

Kim

[11] Patent Number: 4,984,096
[45] Date of Patent: Jan. 8, 1991

[54] VIDEO DISK, DISK PLAYER AND METHOD FOR LONG PLAY MODE CONSTANT ANGULAR VELOCITY PLAYBACK

[75] Inventor: Jin-Nam Kim, Seoul, Rep. of Korea

[73] Assignee: SamSung Electronics Co., Ltd., Kwonsun, Rep. of Korea

[21] Appl. No.: 65,391

[22] Filed: Jun. 23, 1987

[30] Foreign Application Priority Data

Jun. 24, 1986 [KR] Rep. of Korea ................ 86-5023

[51] Int. Cl.$^5$ .............................................. H04N 5/76
[52] U.S. Cl. ..................................... 358/342; 369/32; 369/47; 369/54; 369/58
[58] Field of Search ............... 360/9.1, 10.1, 11.1, 360/73, 73.01, 73.03; 358/335, 342; 369/32, 53, 54, 58, 47, 50

[56] References Cited

U.S. PATENT DOCUMENTS

| | | | |
|---|---|---|---|
| 4,402,018 | 8/1983 | Wada et al. ........................ | 358/342 |
| 4,490,752 | 12/1984 | Machida et al. .................... | 358/342 |
| 4,519,004 | 5/1985 | Wilkinson et al. .................. | 358/342 |
| 4,558,375 | 12/1985 | Sontheimer ........................ | 358/342 |
| 4,638,376 | 1/1987 | Sugiyama et al. ............. | 360/10.1 X |
| 4,647,987 | 3/1987 | Nutting ........................... | 358/342 X |
| 4,688,203 | 8/1987 | Koishi et al. ..................... | 369/54 X |
| 4,698,695 | 10/1987 | Kosaka et al. .................... | 369/54 X |
| 4,739,418 | 4/1988 | Iwahara et al. ................ | 360/10.1 X |
| 4,750,055 | 6/1988 | Van Lier ............................ | 358/342 |
| 4,786,980 | 11/1988 | Sonobe et al. ................. | 358/342 X |

OTHER PUBLICATIONS

Webster's Ninth New Collegiate Dictionary, 1985, pp., 270-271.

Primary Examiner—Alan Faber
Assistant Examiner—W. R. Young
Attorney, Agent, or Firm—Robert E. Bushnell

[57] ABSTRACT

A method for playback in a constant angular velocity video disk player having an extended operating period of playback is described. A synchronization system including four vertical synchronization fields per each track of the disk is used to enable writing of data in higher density, the synchronization fields are detected from the disk to render a count value to which a preset provided from a micro computer is compared, and consequently in response to the comparative result, the disk revolution velocity is decreasingly controlled in order to provide an extended operating period of playback.

27 Claims, 3 Drawing Sheets

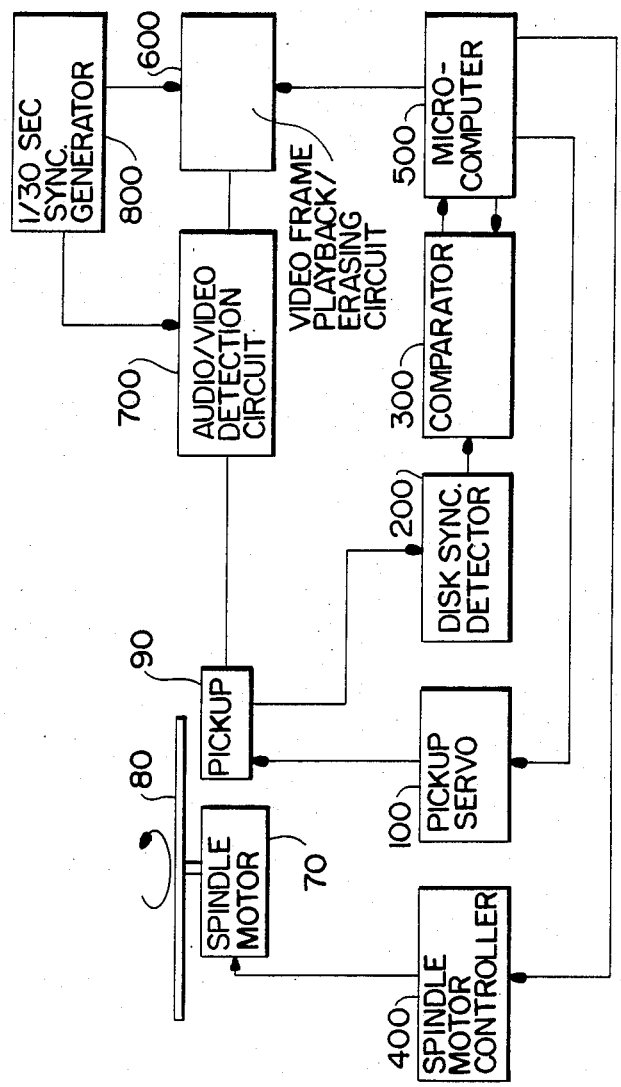
Fig-3
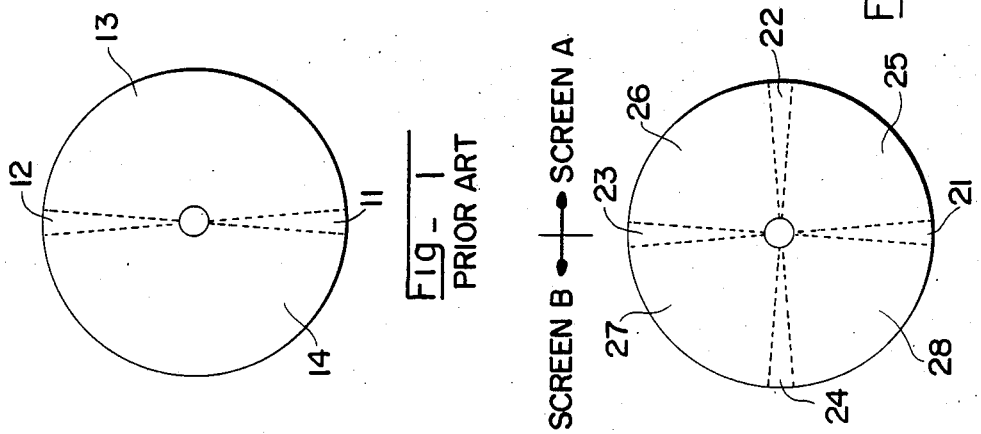
Fig-1 PRIOR ART
Fig-2

VIDEO DISK, DISK PLAYER AND METHOD FOR LONG PLAY MODE CONSTANT ANGULAR VELOCITY PLAYBACK

BACKGROUND OF THE INVENTION

This invention relates to a playback method in a video disk player and more particularly to a playback method for use in a constant angular velocity video disk player having a disk in which data are recorded in high density.

In a conventional video disk player (hereinafter referred to simply as "VDP"), there have been widely used two modes, constant linear velocity (hereinafter referred to simply as "CLV") and constant angular velocity (hereinafter referred to simply a "CAV") in writing/reading original data on/from a disk. Generally, when the disk revolves at a constant driving speed in the VDP, its linear velocity in the inner boundary of tracks of the disk differs from that in the outer boundary of the tracks. For instance, a sufficient and adequate linear density for recording and playback of data is maintained in the inner boundary of the tracks, while excessively thin density for recording and playback is brought about in the outer boundary of the tracks. Therefore in the CLV mode, the farther the outer tracks are from the center of the disk, the lower its revolution velocity correspondingly goes, so that it is invariably maintained at a constant linear velocity. This CLV mode generally has an extended operating time of playback which gives about one hour per each surface of the disk, but it has a disadvantage of not being capable of providing a variety of functions which are usually requested by users.

On the other hand, the CAV mode makes it possible to provide a variety of functions such as "Still Motion", "Reverse Motion", "Free Variable Control of Speed" and so on, but its playback period of operation is disadvantageously short comparing to that in the CLV mode. Referring to the FIG. 1 illustration of a disk format in the CAV mode in prior art, it includes two synchronization fields 11 and 12, and two data field 13 and 14 respectively. Each surface of the disk is divided into two parts, so only two fields of data that consist of a frame of video signals are read out of each track on the disk, and consequently only about half an hour of operating period of playback is permitted for each surface of the disk.

SUMMARY OF THE INVENTION

An object of this invention is to provide a disk for a video disk player of a constant angular velocity mode having an extended playback period of operation in which its vertical synchronization is doubled and accordingly the density of writing data is also doubled therein.

Another object of this invention is to provide a playback method in a video disk player which enables extension of its playback period in detecting doubled synchronization signals from the disk of the video disk player in a constant angular velocity mode, comparing the synchronization signals with a preset value and thereby controlling the disk revolution velocity in accordance with the comparative resulting signal.

In a playback method for a video disk player of the constant angular velocity mode for providing an extended operation period o playback according to this invention, a vertical synchronization system having four periods of vertical synchronization signals per each track of the disk which are increased by two from two periods of vertical synchronization signals per each track in a conventional system is used. The synchronization signals are detected from the disk, a number of the detected synchronization signals is compared to a preset synchronization value stored in a microcomputer, and in response to the comparative result, the revolution velocity of the disk is controlled decreasingly or in normal state to enable extension of its playback time of operation in accordance with controls of a microcomputer.

BRIEF DESCRIPTION OF THE DRAWINGS

FIG. 1 is a plot illustrating a data format for synchronization on a constant angular velocity disk according to the prior art.

FIG. 2 is a plot illustrating a data format for synchronization on a constant angular velocity disk according to the present invention.

FIG. 3 is a block diagram showing a portion of a video disk player system according to the present invention.

DETAILED DESCRIPTION

Figure 4:
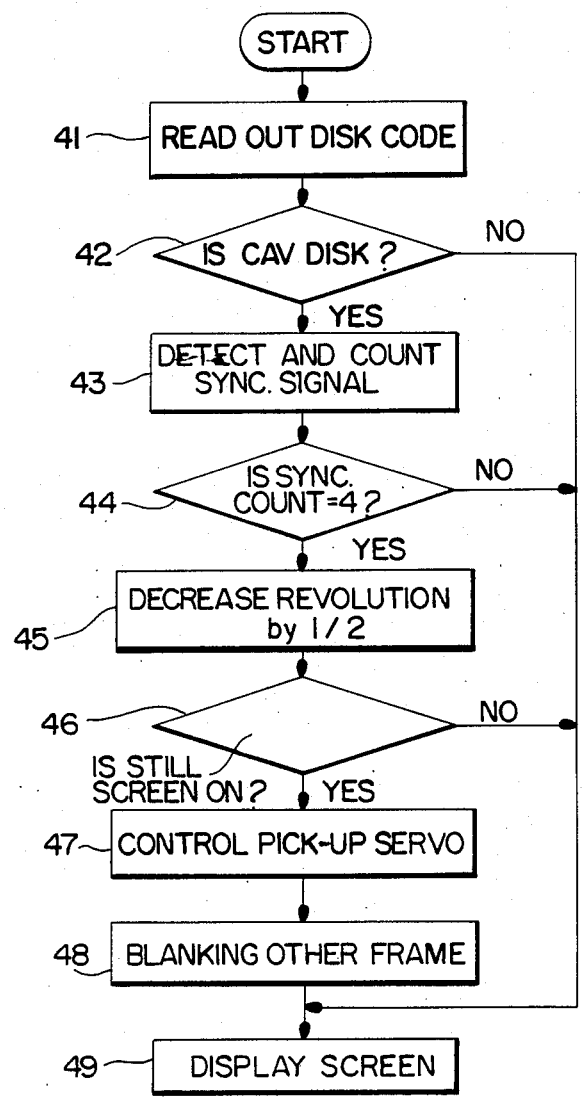
FIG. 4 is a flow chart diagram of a method for playback in the video disk player system according to the present invention.

Referring now to FIG. 2 illustrating a synchronization format in a CAV disk according to the present invention, each of sections 21-24 represent a synchronization field in the CAV disk which do not include data signals for screen playback, and each of sections 25-28 represent data fields, first or second of which each video screen "A" or "B" consists. For example, being divided into two parts, screen "A" and screen "B", the CAV disk has a first data field area 25 for the screen "A", a second data field area 26 for the screen "A", a first data field area 27 for the screen "B", and a second data field area 28 for the screen "B".

Being compared to the conventional synchronization format illustrated in FIG. 1, the CAV disk of the present invention has double synchronization fields for writing data signals on each track, in which a double writing density for screen image data is gained and thereby an hour of playback per each surface is achieved.

FIG. 3 represents a block diagram for a portion of a video disk player system according to the present invention, which includes a CAV disk 80 for which vertical synchronization is doubled and original audio/video signals are therein recorded into digital data, a spindle motor 70 for driving the CAV disk 80, a pickup 90 to read out original audio and video data signals that are recorded in the disk 80, a pickup servo 100 to control motions of the pickup 90, a disk synchronization detector 200 to detect frame synchronization signals on the disk 80, a comparator 300 for comparing the frame synchronization signals with preset synchronization data, a spindle motor controller 400 to control the revolution velocity of the spindle motor 70 in response to the comparative result signal from the comparator 300, a microcomputer 500 having a control program for controlling reading of the audio/video signals from the disk and processing or storing data obtained from execution of playback operation in the video disk player, a video frame playback/erasing circuit 600 which is coupled to the microcomputer 500 for disabling playback of unnecessary frames that are the frames not assigned by the micro computer 500 in order to prevent the screen from vibrating while in Still Screen, an audio/video detection circuit 700 to detect the audio/video signals in a range of bandpass, and a 1/30-sec synchronization generator for providing 1/30 second period synchronization signals so as to enable access to only video signals to the exclusion of audio signals in the video memory.

Figure 5:
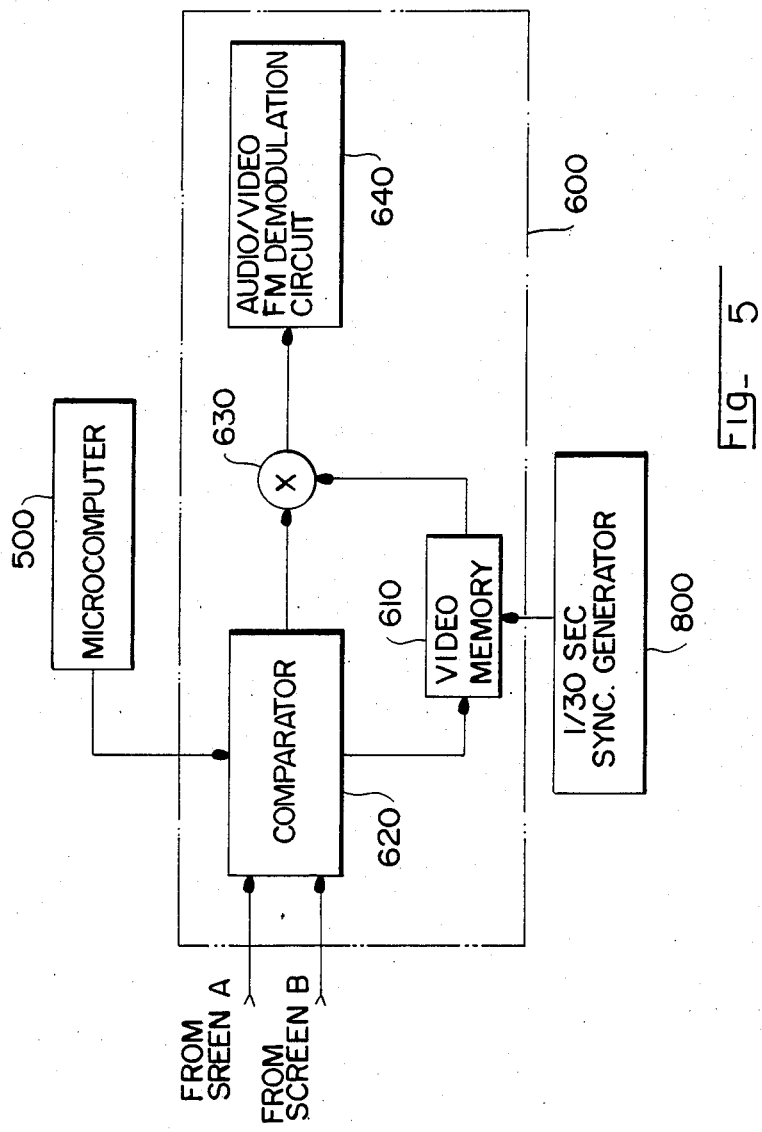
FIG. 5 is a detailed block diagram of the video frame playback/erasing circuit of FIG. 3 according to the present invention.

FIG. 5 represents a detailed block diagram of the video frame playback/erasing circuit 600 in FIG. 3, for disabling the other side of video frame in the operation of "Still Screen", wherein there are included a comparator 620 for selecting a still screen assigned by the microcomputer 500 by receiving data for both screen A and B supplied from the audio/video detection circuit 700, a video memory 610 to store the video signals selected in the comparator 620 in accordance with the synchronization of the 1/30-sec synchronization generator 800, a multiplier 630, and a conventional video/audio FM demodulation circuit 640.

Hereinafter, the operation of the present invention will be described in detail in connection with the flow chart diagram of FIG. 4 showing a method for playback in the video disk player system.

Assuming that an operator of a video disk player has selected a "Play" key to assign its CAV disk 80 to the "Play" mode, the spindle motor 70 is controlled by its spindle motor controller 400 and by this the CAV disk 80 starts its revolution. At this time, the pickup 90 picks up the original signals which were in advance recorded in the CAV disk 80.

Referring to FIG. 4, once an identifier code is read out from the CAV disk in block 41, it is checked by the code in decision block 42 to determine whether the CAV disk is for a long play mode or not. If it is the long play mode of the CAV disk, the disk synchronization detector 200 counts the number of the synchronization fields per each track in block 43 and feeds the count number to the comparator 300. The count number is compared in decision block 44 to a preset synchronization value (herein, this value corresponds to "4") provided by the microcomputer 500 and a resulting logic signal responsive to this comparison is fed to the microcomputer 500. When the count number is equal to the preset value, the recording density of the disk 80 is high. Accordingly, its revolution velocity is driven down by ½ in block 45 so as to enable reading of data from the disk recorded in high density.

When the spindle motor controller 400 receives a control signal from the microcomputer 500, it drives the spindle motor 70 to the revolution velocity decreased by ½ from that of the conventional CAV disk in FIG. 1.

Meanwhile, all the other functions excepting "Still Motion" in the disk according to the invention are operated in the same manner a the disk of the prior art. However, it differs in "Still Motion". Because 2 frames of data per one revolution of the disk are read out for the playback in "Still Motion", there arise vibrations of the screen. Therefore, frame numbers written in a track of the disk are detected and fed to the microcomputer 500, and from this the other side of the track of the disk having a frame which is unnecessary for the screen of "Still Motion" is filtered out and does not to generate video signals.

That is, it is checked in block 46 whether a key selector for the "Still Motion" is "ON" or not. From the block 46, if "Still Motion" has been selected the pickup servo 100 is controlled in block 47 in accordance with its necessary screen number and frame number.

After that, the unnecessary frame data of the other half side of the same track are erased out in block 48 by video frame playback/erasing circuit 600 and is not to be generated for the screen and consequently an adequate screen for the "Still Motion" is displayed in block 49. In cases where disk 80 is not a CAV disk, or transferred from blocks synchronization fields per each track in disk, or it is not in the "Still Motion", its operating sequence is directly transferred from blocks 42, 44 and 46 to the block 49 to thereby make possible provision of the required screens under the controls of the microcomputer 500.

Referring now to FIG. 5, the operation performed in the "Still Motion" function in the block 46 47, and 48 is described in greater detail hereinafter. Because there exists the difference of 1/30 sec between the input times of screen A and screen B, the microcomputer 500 searches out the required frame number in accordance with the selection of its user and also controls disabling of playback of the other unnecessary frame within the same track. With the synchronization of 1/30 sec synchronization generator 800, digital data of video signals for the screen of the "Still Motion" are stored in video memory 610. In the "Still Motion" mode, the digital data stored in the video memory 610 are read out and fed to the audio/video FM demodulation circuit 640 through the multiplier 630, and as a result, only the screen of "Still Motion" is displayed.

As described hereinbefore, it becomes possible in the CAV disk mode to have a long playback time the same as in the CLV disk mode, and as well the VDP has all of the same functions as those in the conventional VDP system without fundamental change or addition in the circuit arrangement.

What is claimed is:

1. A playback method for use in a constant angular velocity video disk player having a disk with four fields of vertical synchronization signals included for each track on the disk and original audio/video signals in high density recorded in data fields on said track as data, a spindle motor for driving said disk, a pickup to read said original signals from said disk, a pickup servo to control motion of said pickup, a disk synchronization detector for reading synchronization signals from said disk, a spindle motor controller for controlling motions and velocity of said spindle motor, a microcomputer having a control program and a memory for executing playback operation of the disk, a video/audio detection circuit for reading said original video/audio signals from said disk, a comparator which compares a count value of said synchronization signals with preset synchronization data provided from said microcomputer, a video frame playback/erasing circuit for disabling playback of unnecessary frames and enabling playback of necessary frames on said disk in accordance with controls of said microcomputer and a synchronization generator providing synchronization signals of 1/30 second period, said method comprising the steps of:

checking a mode of said disk by reading a disk identifier code of said disk;

detecting said synchronization signals of said disk and thereby counting a number of said fields of vertical synchronization signals per each track of said disk;

comparing said number of fields of vertical synchronization signals to preset synchronization data provided from said microcomputer;

decreasing the revolution velocity of said disk in accordance with controls of said microcomputer if said number of fields of vertical synchronization signals is equal to said preset data;

determining whether a function for displaying still motion on a screen has been selected and thereby disabling playback of said unnecessary frames of said disk in accordance with controls of said microcomputer when said function has been selected; and displaying on the screen said original video signals which are not recorded in said unnecessary frames.

2. A constant angular velocity video disk player, comprising:

means for driving a video disk containing information stored in data fields along a plurality of tracks and in synchronization fields arranged as arcuately spaced apart sectors separating said data fields, at constant angular velocities;

means for reading an identifier code and information stored in the tracks on a disk driven by said driving means;

first means for detecting from said information read by said reading means, synchronization signals stored within said synchronization field;

means for making a comparison between a count of the number of synchronization fields detected by said first detecting means and a preset synchronization value, and for providing a comparative signal on the basis of the comparison;

second means for detecting audio and video signals from said information read by said reading means;

means for disabling audio and video signals detected by said second detecting means corresponding to unselected frames of video display;

a generator providing synchronization periods to said second detecting means and said disabling means; and means for controlling reading of the information by said reading means, for supplying the preset value to said comparison making means, for varying on the basis of said comparative signal the constant angular velocity at which said driving means drives a video disk and for designating information stored in the data fields as corresponding to selected and unselected frames of video display.

3. The player of claim 2, wherein said comparison making means compares the number of synchronization fields per track with said preset value.

4. The player of claim 2, wherein when said identifier code corresponds to a first play mode, said first detecting means counts from said information read by said reading means, the number of synchronization fields per each track of the disk;

said comparison making means compares the number of synchronization fields per each track with the preset value; and if the number of synchronization fields per each track is determined by said comparison making means to equal the preset value, said control means regulates said driving means to change the angular velocity at which the driving means drives the disk.

5. The player of claim 2, wherein said disabling means comprises:

comparator means for receiving video signals corresponding to a plurality of frames of a video display stored on a single track of the disk, and for selecting on the basis of assignment by said control means a selected one of said frames; and memory means coupled to receive the synchronization periods from said generator, for storing video signals corresponding to said selected one of said frames.

6. The player of claim 2, wherein said information includes frame numbers of the audio and video signals for each frame of video display, and wherein said disabling means comprises:

comparator means for receiving video signals corresponding to a plurality of frames of video displays stored on a single track of the disk, and for selecting video signals for a selected one of said frames on the basis of an assignment of a frame number by said control means; and memory means coupled to receive the synchronization periods from said generator, for storing video signals corresponding to said selected one of said frames.

7. The player of claim 4, wherein said information includes frame numbers of the audio and video signals for each frame of video display, and wherein said disabling means comprises:

comparator means for receiving video signals corresponding to a plurality of frames of video displays stored on a single track of the disk, and for selecting video signals for a selected one of said frames on the basis of an assignment of a frame number by said control means; and memory means coupled to receive the synchronization periods from said generator, for storing video signals corresponding to said selected one of said frames.

8. A playback method for use in a constant angular velocity video disk player having a disk with fields of vertical synchronization signals included for each track on the disk and original audio/video signals recorded in data fields on said track as data, said method comprising the steps of:

checking a mode of said disk by reading a disk identifier code of said disk;

detecting said synchronization signals of said disk and thereby counting a number of said fields of vertical synchronization signals per each track of said disk;

making a comparison of said number of fields of vertical synchronization signals with preset synchronization data;

changing the revolution velocity of said disk in accordance with said comparison;

determining whether a function for displaying still motion on a screen has been selected and thereby disabling playback of unnecessary frames of said disk when said function has been selected; and displaying on the screen said original video signals which are not recorded in said unnecessary frames.

9. A video disk player, comprising:

means for reading an identifier code and information stored in data fields on circular tracks of a video disk rotating at an angular velocity;

first means for detecting from said information read by said reading means, synchronization fields stored on the video disk;

means for making a comparison between a count of the number of synchronization fields detected by said first detecting means and a preset synchronization value;

second means for detecting audio and video signals from said information read by said reading means;

means for disabling audio and video signals detected by said second detecting means corresponding to unselected frames of video display;

a generator providing synchronization periods to said second detecting means and said disabling means; and means for controlling reading of the information by said reading means, for supplying the preset value to said comparison making means, for varying on the basis of said comparison the angular velocity at which the video disk is rotating and for designating information stored in the data fields as corresponding to selected and unselected frames of video display.

10. The player of claim 9, wherein said comparison making means compares the number of synchronization fields per track with said preset value.

11. The player of claim 9, wherein when said identifier code corresponds to a first play mode, said first detecting means counts from said information read by said reading means, the number of synchronization fields per each track of the disk;

said comparison making means compares the number of synchronization fields per each track with the preset value; and if the number of synchronization fields per each track is determined by said comparison making means to equal the preset value, said controlling means regulates said driving means to change the angular velocity at which the disk is rotating.

12. The player of claim 9, wherein said disabling means comprises:

comparator means for receiving video signals corresponding to a plurality of frames of a video display stored on a single track of the disk, and for selecting on the basis of assignment by said control means a selected one of said frames; and memory means coupled to receive the synchronization periods from said generator, for storing video signals corresponding to said selected one of said frames.

13. The player of claim 9, wherein said information includes frame numbers of the audio and video signals for each frame of video display, and wherein said disabling means comprises:

comparator means for receiving video signals corresponding to a plurality of frames of video displays stored on a single track of the disk, and for selecting video signals for a selected one of said frames on the basis of an assignment of a frame number by said control means; and memory means coupled to receive the synchronization periods from said generator, for storing video signals corresponding to said selected one of said frames.

14. The player of claim 11, wherein said information includes frame numbers of the audio and video signals for each frame of video display, and wherein said disabling means comprises:

comparator means for receiving video signals corresponding to a plurality of frames of video displays stored on a single track of the disk, and for selecting video signals for a selected one of said frames on the basis of an assignment of a frame number by said control means, and memory means coupled to receive synchronization periods from said generator, for storing video signals corresponding to said selected one of said frames.

15. A disk player, comprising:

means for detecting synchronizing fields and video signals from a circular disk containing a plurality of circular tracks for storing data signals;

each of said tracks containing separate and successive first and second data fields for storage of data signals representing a first playback frame;

each of said tracks containing separate and successive third and fourth data fields for storage of data signals representing a second playback frame;

each of said tracks containing four synchronization fields of synchronization signals devoid of said data signals with each one of said fields of synchronization signals being spaced between a different pair of said first, second, third and fourth data fields;

means coupled to receive said data signals, for disabling generation of data signals corresponding to unselected frames;

means for providing synchronization periods to said detecting means and said disabling means; and means for controlling said detecting of data signals by said detecting means, for making a comparison between a count of the number of synchronization fields detected and a synchronization value, for varying on the basis of said comparison an angular velocity at which the video disk is rotating, and for designating information stored in the data fields as corresponding to selected and unselected frames.

16. The video disk player of claim 15, wherein the fields of vertical synchronization signals for said plurality of tracks form arcuately spaced apart sectors on said disk interposed between said data fields.

17. The video disk player of claim 15, wherein the tracks contain numbers of frames corresponding to said video screens.

18. The video disk player of claim 16, wherein the tracks contain numbers of frames corresponding to said video screens.

19. A video disk player, comprising:

means for detecting synchronizing fields and video signals from a circular video disk containing a plurality of circular tracks for storing data signals;

each of said tracks containing non-contiguous first, second, third and fourth data areas for storage of data signals representing playback frames;

said first data area storing data signals for a first data field of a first of the frames;

said second data area sequentially following said first data area and storing data signals for a second data field of said first of the frames;

said third data area sequentially following said second data area and storing data signals for a first data field of a second of the frames;

said fourth data area sequentially following said third data area and storing data signals for a second data field of said second of the frames; and each of said tracks containing four fields of synchronization signals devoid of said data signals with different ones of said four fields of synchronization signals being spaced between different pairs of said first, second, third and fourth data areas;

means coupled to receive said data signals, for disabling generation of video signals corresponding to unselected frames;

means for providing synchronization periods to said detecting means and said disabling means; and means for controlling said detecting of data signals by said detecting means, for making a comparison between a count of the number of synchronization fields detected and a synchronization value, for varying on the basis of said comparison the angular velocity between said detecting means and the disk, and for designating information stored in the data fields as corresponding to selected and unselected frames.

20. The video disk player of claim 19, wherein the fields of vertical synchronization signals for said plurality of tracks form arcuately spaced apart sectors on said disk interposed between said data areas.

21. The video disk player of claim 19, wherein the tracks contain numbers of frames corresponding to said video screens.

22. The video disk player of claim 20, wherein the tracks contain numbers of frames corresponding to said video screens.

23. A video disk player, comprising:
  means for detecting synchronization fields on a video disk, and for obtaining video signals stored on tracks on the video disk while the video disk is rotating at an angular velocity;
  means coupled to receive said video signals, for disabling generation of video signals corresponding to unselected frames of video display;
  means for providing synchronization periods to said detecting means and said disabling means; and
  means for controlling said obtaining of video signals by said detecting means, for making a comparison between a count of the number of synchronization fields detected and a set of synchronization value, for varying on the basis of said comparison the angular velocity at which the video disk is rotating, and for designating information stored in the data fields as corresponding to selected and unselected frames of video display.

24. The video disk player of claim 23, wherein said controlling means compares a count of the number of synchronization fields per track with said set synchronization value.

25. The video disk player of claim 23, wherein said detecting means further comprises means for reading an identifier code from the video disk, and wherein when said identifier code corresponds to a first play mode, said detecting means counts the number of synchronization fields for each track of the video disk;
  said controlling means compares the number of synchronization fields for each track with the set synchronization value; and
  if the number of synchronization fields for each track is determined by said controlling means to equal the said synchronization value, said controlling means changes the angular velocity at which the disk is rotating.

26. The video disk player of claim 23, wherein said disabling means comprises:
  comparator means for receiving video signals corresponding to a plurality of frames of a video display stored on a single track of a disk, and for selecting on the basis of assignment by said controlling means a selected one of said frames; and
  memory means coupled to receive the synchronization periods from said providing means, for storing video signals corresponding to said selected one of said frames.

27. The video disk player of claim 25, wherein said disabling means comprises:
  comparator means for receiving video signals corresponding to a plurality of frames of a video display stored on a single track of a disk, and for selecting on the basis of assignment by said controlling means a selected one of said frames; and
  memory means coupled to receive the synchronization periods from said providing means, for storing video signals corresponding to said selected one of said frames.

* * * * *